United States Patent
Nakatsu

(10) Patent No.: US 10,443,866 B2
(45) Date of Patent: Oct. 15, 2019

(54) METHOD FOR FABRICATING A PIPE UNIT AND A METHOD FOR INSTALLING AN AIR CONDITIONING DEVICE

(71) Applicant: DAIKIN INDUSTRIES, LTD., Osaka-shi, Osaka (JP)

(72) Inventor: Nobuhiko Nakatsu, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 120 days.

(21) Appl. No.: 15/418,945

(22) Filed: Jan. 30, 2017

(65) Prior Publication Data

US 2017/0138618 A1    May 18, 2017

Related U.S. Application Data

(62) Division of application No. 14/648,764, filed as application No. PCT/JP2013/007169 on Dec. 5, 2013.

(30) Foreign Application Priority Data

Dec. 7, 2012 (JP) .................................. 2012-268713

(51) Int. Cl.
*F24F 1/34* (2011.01)
*F24F 1/32* (2011.01)
(Continued)

(52) U.S. Cl.
CPC ................. *F24F 1/34* (2013.01); *F16L 59/14* (2013.01); *F24F 1/32* (2013.01); *F24F 3/065* (2013.01);
(Continued)

(58) Field of Classification Search
CPC ......... Y10T 29/49359; Y10T 29/49377; Y10T 29/49391; Y10T 29/49389; F28F 2265/10; F28F 9/013–0138
See application file for complete search history.

(56) References Cited

U.S. PATENT DOCUMENTS 2,708,833 A    5/1955 Nigro
5,927,093 A    7/1999 Noguchi et al.
(Continued)

FOREIGN PATENT DOCUMENTS

EP    1278022 A1    1/2003
EP    2402667 A2    1/2012
(Continued)

OTHER PUBLICATIONS

English Translation JPH1172189 Mar. 16, 1999.*
(Continued)

*Primary Examiner* — Jason L Vaughan
*Assistant Examiner* — Amanda Kreilling
(74) *Attorney, Agent, or Firm* — Birch, Stewart, Kolasch & Birch, LLP

(57) ABSTRACT

A pipe unit is provided for a refrigerant circuit which performs a vapor compression refrigeration cycle by circulating a refrigerant. The pipe unit includes a pipe body having a liquid pipe through which a liquid refrigerant for the refrigerant circuit flows and a gas pipe through which a gaseous refrigerant for the refrigerant circuit flows; and a heat insulator covering each of the liquid pipe and the gas pipe separately. The liquid pipe and the gas pipe, each of which is covered with the heat insulator, are fixed together to form a single piece. Such partial unitization of the refrigerant circuit allows for reduction in the number of days required for installation of an air conditioner.

3 Claims, 11 Drawing Sheets

(51) Int. Cl.
*F24F 3/06* (2006.01)
*F16L 59/14* (2006.01)
*F25B 41/00* (2006.01)

(52) U.S. Cl.
CPC ......... *F25B 41/003* (2013.01); *F25B 2500/11* (2013.01); *F25B 2500/18* (2013.01)

(56) References Cited

U.S. PATENT DOCUMENTS

| | | | |
|---|---|---|---|
| 6,427,484 | B1 | 8/2002 | Choi et al. |
| 2007/0113582 | A1 | 5/2007 | Sao et al. |

FOREIGN PATENT DOCUMENTS

| | | | | |
|---|---|---|---|---|
| FR | | 2906014 B1 | | 3/2008 |
| JP | | 7-280376 A | | 10/1995 |
| JP | | 3037425 U | | 5/1997 |
| JP | | 11-72189 A | | 3/1999 |
| JP | | 2000-2368 A | | 1/2000 |
| JP | | 2004-197876 A | | 7/2004 |
| JP | | 2004197876 A | * | 7/2004 |
| JP | | 2005-337524 A | | 12/2005 |
| JP | | 2007-232286 A | | 9/2007 |
| JP | | 2007232286 A | * | 9/2007 |
| JP | | 2009041784 A | * | 2/2009 |
| JP | | 2010-281335 A | | 12/2010 |
| WO | WO | 01/81834 A1 | | 11/2001 |
| WO | WO | 2014/087662 A1 | | 6/2014 |

OTHER PUBLICATIONS

JP-2009041784-A English Translation Taguchi (Year: 2009).*
JP-2004197876-A English Translation Furata (Year: 2004).*
JP-2007232286-A English Translation Fukuyama (Year: 2007).*
International Search Report, issued in PCT/JP2013/007169, dated Mar. 4, 2014.

* cited by examiner

METHOD FOR FABRICATING A PIPE UNIT AND A METHOD FOR INSTALLING AN AIR CONDITIONING DEVICE

CROSS-REFERENCE TO RELATED APPLICATIONS

This application is a Divisional of pending U.S. patent application Ser. No. 14/648,764, filed on Jun. 1, 2015, which is a National Phase of International Patent Application No. PCT/JP2013/007169, filed on Dec. 5, 2013, which claims the benefit of Japanese Patent Application No. 2012-268713, filed on Dec. 7, 2012. The entire contents of which are hereby incorporated by reference.

TECHNICAL FIELD

The present invention relates to a pipe unit of an air conditioner, and more particularly relates to a pipe unit of a refrigerant circuit.

BACKGROUND ART

Some conventional air conditioners are installed in buildings by connecting a plurality of indoor units to a single outdoor unit as disclosed by Patent Document 1. In the present circumstances, most of the installation process of such an air conditioner, including pipe connection, is performed on site after the framework of the building is finished.

CITATION LIST

Patent Document

[Patent Document 1] Japanese Unexamined Patent Publication No. H07-280376

SUMMARY OF THE INVENTION

Technical Problem

In the conventional installation process of the air conditioners, however, most of its piping work is done on site, and a refrigerant circuit is not unitized in the present circumstances. Thus, it takes many days to finish installing the conventional air conditioners, which is a problem. Specifically, pipe installation and heat insulation work need to be performed in confined space such as a roof space. Thus, it takes a great number of skilled workers and long working hours to get such installation done, which is also a problem. For these reasons, there have been growing demands for unitization of the refrigerant circuit.

In view of these problems, the present invention has been made to reduce the number of days required for the installation by partially unitizing the refrigerant circuit.

Solution to the Problem

A first aspect of the invention is a pipe unit provided for a refrigerant circuit (40) which performs a vapor compression refrigeration cycle by circulating a refrigerant. According to the first aspect of the invention, the pipe unit includes a pipe body (53) having a liquid pipe (51) through which a liquid refrigerant for the refrigerant circuit (40) flows and a gas pipe (52) through which a gaseous refrigerant for the refrigerant circuit (40) flows; and a heat insulator (54) covering an outer periphery of the pipe body (53). The liquid pipe (51) and the gas pipe (52) of the pipe body (53) are fixed together to form a single piece.

According to the first aspect of the invention, a refrigerant circuit (40) is partially unitized by fixing a liquid pipe (51) and a gas pipe (52) together to form a single piece. The fabrication of a pipe body (53) and the covering of the pipe body (53) with a heat insulator (54) can be performed in a factory. This allows for reduction in the number of days required for installation of an air conditioner.

A second aspect of the invention is an embodiment of the first aspect of the invention. In the second aspect, the heat insulator (54) covers each of the liquid pipe (51) and the gas pipe (52) separately, and the liquid pipe (51) and the gas pipe (52), each of which is covered with the heat insulator (54), are fixed together to form a single piece.

According to the second aspect of the invention, the heat insulator (54) covers each of the liquid pipe (51) and the gas pipe (52) separately, and the liquid pipe (51) and the gas pipe (52), each covered with the heat insulator (54), are fixed together to form a single piece. This allows for simplification of fabrication work.

Advantage of the Invention

According to the present invention, the refrigerant circuit (40) is partially unitized by fixing the liquid pipe (51) and the gas pipe (52) together to form a single piece. Thus, the pipe unit of the present invention can be fabricated in a factory. This reduces the number of days required for the installation of the air conditioner significantly. Specifically, the connecting work which has been carried out on site is replaced with the work in the factory. This allows workers to get their work in a confined roof space and other time-consuming jobs done much more easily, thereby reducing the number of days required for the installation significantly.

In particular, the brazing process for connecting the pipe body (53) is performed only in the factory. Thus, work using fire is restricted only to the factory, and no work using fire is performed on site any longer. This eliminates the occurrence of fire accidents on site. In addition, the brazing process performed in the factory reduces the number of positions where the fitting couplings (43) are used. This reduces the number of the expensive couplings (43) to use, which allows for cutting down the installation cost.

The pipe body (53) is covered with the heat insulator (54) in the factory. This reduces significantly the need for covering the parts with the heat insulators (54) on site. As a result, the accuracy of the heat insulation work increases significantly, thereby preventing the moisture condensation with reliability. In particular, the moisture condensation may occur after a year or more has passed since the installation was finished. The pipe unit of the present invention is very effective at preventing such moisture condensation.

According to the second aspect of the invention, the heat insulator (54) covers each of the liquid pipe (51) and the gas pipe (52) separately, and the liquid pipe (51) and the gas pipe (52), each covered with the heat insulator (54), are integrated to form a single piece. This allows for simplification of fabrication work.

DESCRIPTION OF EMBODIMENTS

Embodiments of the present invention will now be described in detail with reference to the drawings.

Figure 1:
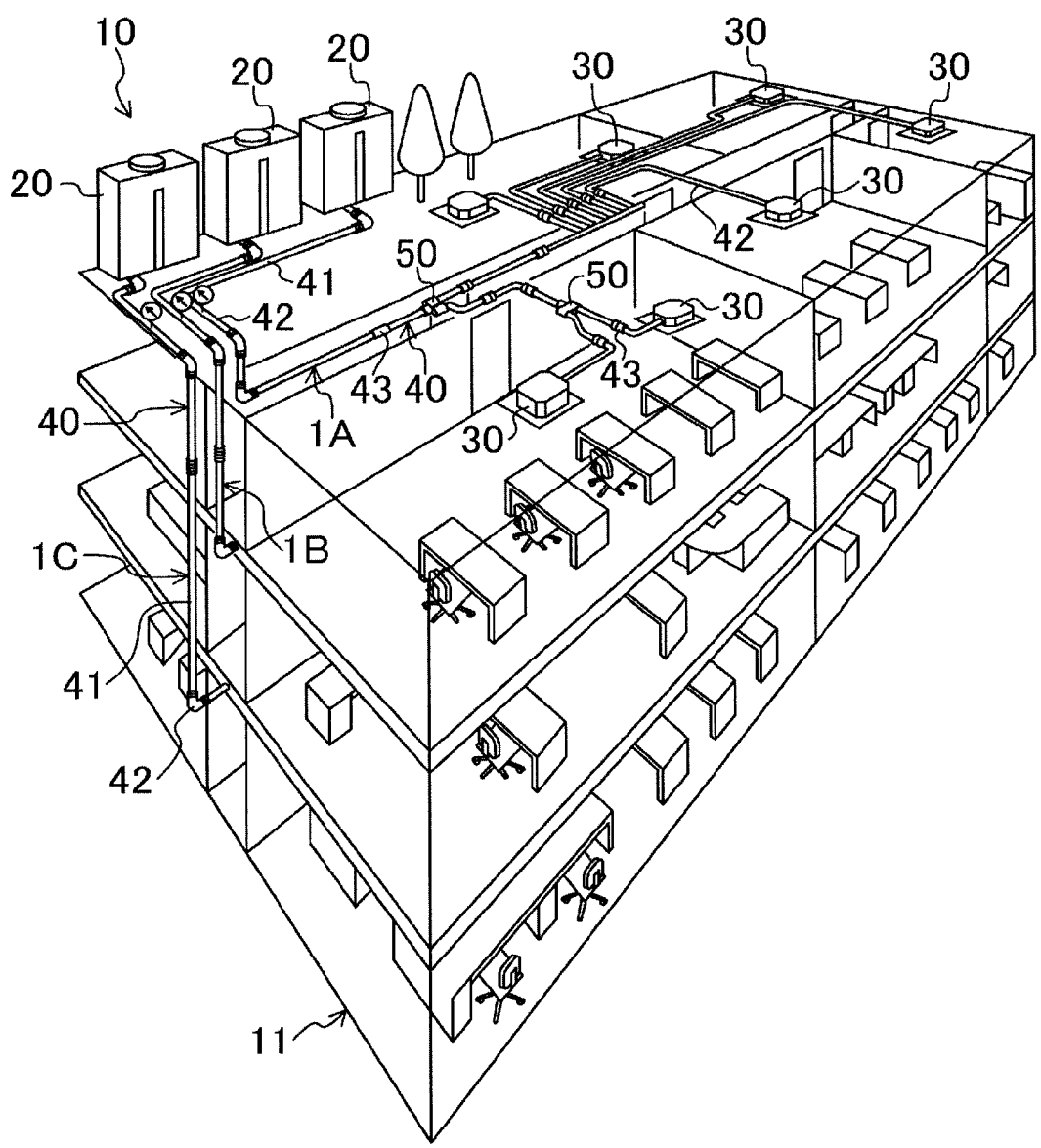
FIG. 1 is a perspective view showing a general configuration for an air conditioner.

As shown in FIG. 1, an air conditioner (10) of the present embodiment is an air-conditioner for buildings installed in, for example, a building (1) which is a construction, and is a so-called multiple air conditioner in which each single outdoor unit (20) is connected to a plurality of indoor units (30).

The air conditioner (10) includes refrigerant systems (1A, 1B, 1C), each of which includes a single outdoor unit (20) and a plurality of indoor units (30) and is provided for an associated one of multiple different floors. For example, the air conditioner (10) includes three refrigerant systems. The air conditioner (10) includes, in each of the refrigerant systems (1A, 1B, 1C), a refrigerant circuit (40) which performs a vapor compression refrigeration cycle by circulating a refrigerant between the outdoor unit (20) and the indoor units (30).

The outdoor unit (20) is installed on the roof floor of the building (11), for example, and includes a casing that houses devices such as a compressor, an outdoor heat exchanger and an outdoor fan. On the other hand, each of the indoor units (30) is configured to be mounted on the ceiling of an associated one of multiple different rooms, and includes a casing that houses devices such as an indoor heat exchanger and an indoor fan.

The refrigerant circuit (40) connecting the outdoor unit (20) and the indoor units (30) is configured by connecting the compressor and other devices together with a refrigerant pipe (41). The refrigerant pipe (41) includes a liquid pipe through which a liquid refrigerant flows, and a gas pipe through which a gaseous refrigerant flows, and is composed of a plurality of parts (42). Examples of the parts (42) include straight pipes, elbows, branched pipes, and headers.

In particular, the refrigerant pipe (41) includes factory-assembled parts and site-assembled parts. Most of the refrigerant pipe (41) is comprised of the factory-assembled parts. The factory-assembled parts include a pipe unit (50), which is one of the parts (42), and the site-assembled parts include the outdoor unit (20), the indoor units (30), and couplings (43).

The pipe unit (50) is one of the parts (42), and includes, as shown in FIGS. 2-5, a pipe body (53) including a liquid pipe (51) and a gas pipe (52), and a heat insulator (54) covering the outside of the pipe body (53).

Figure 2:
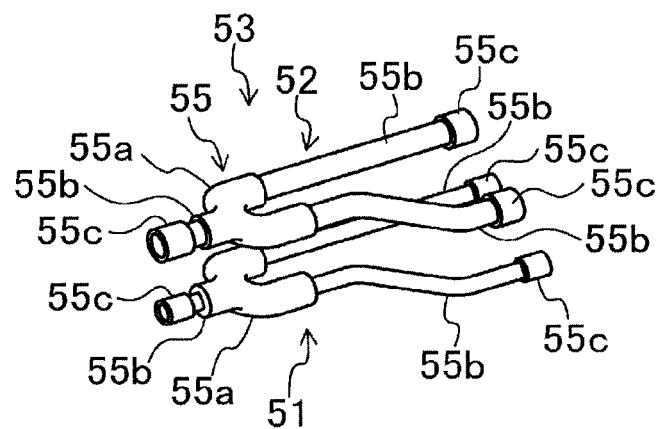
FIG. 2 is an exploded perspective view showing a branch coupling unit as a first pipe unit.
Figure 3:
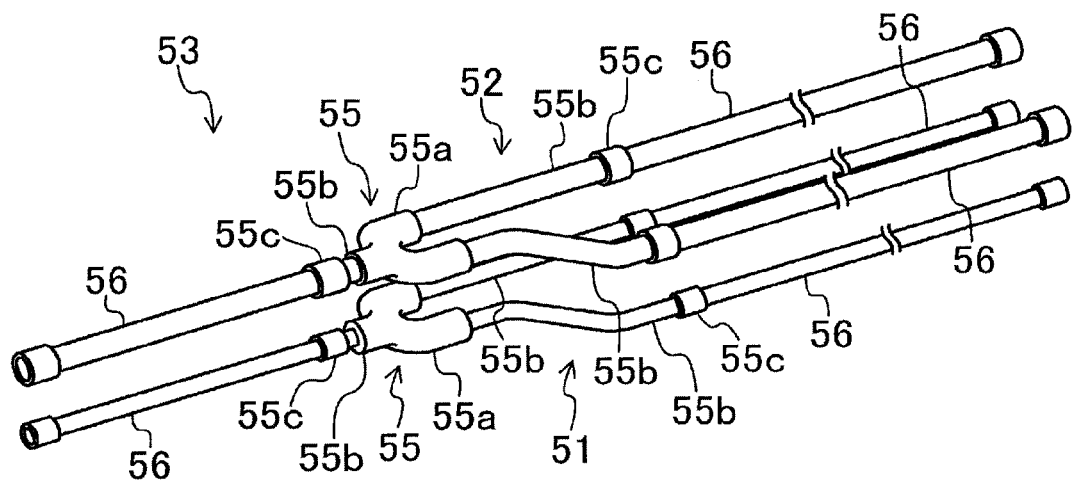
FIG. 3 is an exploded perspective view showing a pipe body of the first pipe unit.
Figure 4:
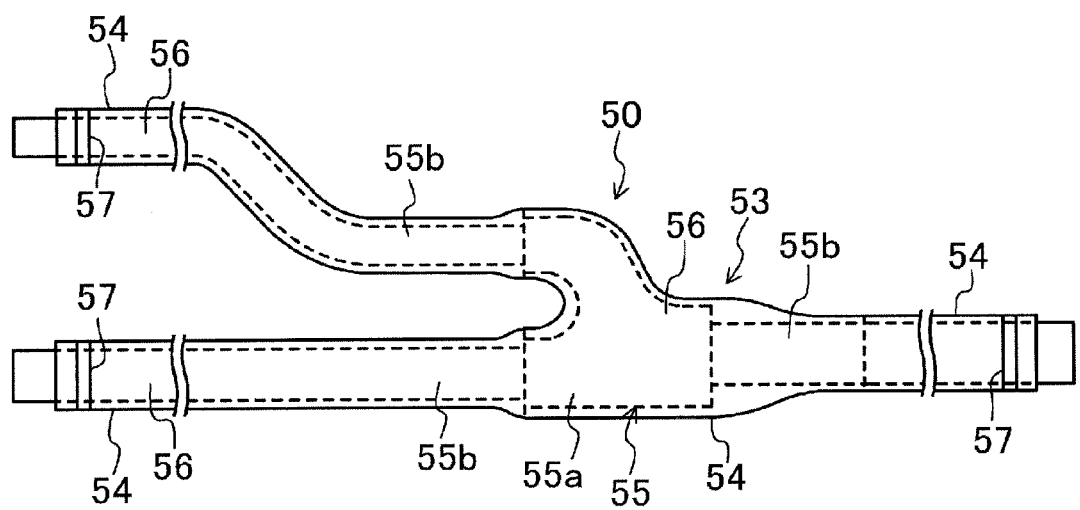
FIG. 4 is a plan view showing the first pipe unit.

The first pipe unit (50) shown in FIGS. 2-4 is implemented as a branch pipe unit. Each of the liquid pipe (51) and the gas pipe (52) of the first pipe unit (50) includes a branch coupling (55) and extension pipes (56) connected to the branch coupling (55). The branch coupling (55) includes a bifurcated branch pipe (55a) and short pipes (55b) connected to the bifurcated branch pipe (55a).

One end of each of the short pipes (55b) is connected to the branch pipe (55a) by brazing. The other end of each of the short pipes (55b) forms a large-diameter connector (55c), to which the extension pipe (56) is connected by brazing. The extension pipe (56) has its length and degree of bending determined by the planning step to be described later.

The heat insulator (54) is provided for each of the liquid pipe (51) and the gas pipe (52) to coat the liquid pipe (51) and the gas pipe (52) entirely outside.

The liquid pipe (51) and the gas pipe (52) coated with the heat insulator (54) are fixed together with a tape (57) or any other fixing member to form the pipe body (53). An end of the pipe unit (50) is marked with a number indicating a connection position determined in the planning step. The tape (57) may be implemented as a colored tape indicating the connection position.

Figure 5:
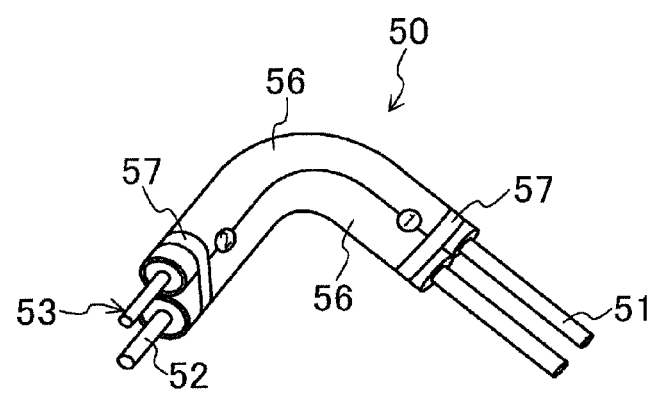
FIG. 5 is a perspective view showing a second pipe unit.

The second pipe unit (50) shown in FIG. 5 is implemented as a bent unit. This pipe unit (50) also includes a pipe body (53) and a heat insulator (54) covering the outside of the pipe body (53). A colored tape (57) indicating the connection position is wound around each end of the heat insulator (54) of the pipe unit (50). The pipe unit (50) is marked with a number indicating the connection position.

Figure 6:
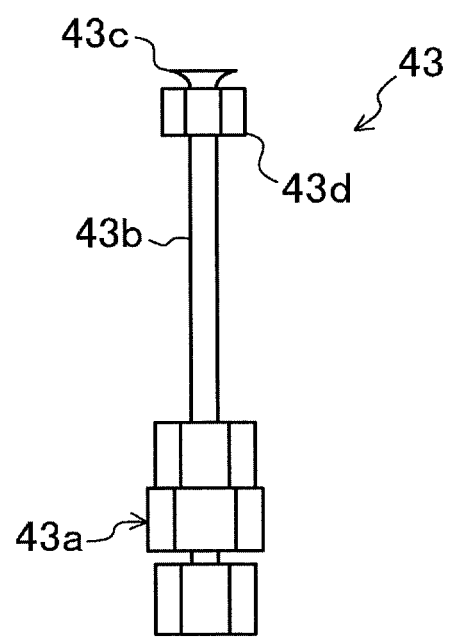
FIG. 6 is a plan view showing a coupling.

Some coupling (43), which is one of the parts (42), may be implemented as a reducing pipe coupling connecting a large-diameter pipe and a small-diameter pipe together as shown in FIG. 6. The reducing pipe coupling (43) includes a fitting coupling (43a) and a reducing pipe (43b) which form integral parts of a single piece. The fitting coupling (43a) allows for connection without using fire, and has one end configured to be connectable to a large-diameter pipe, and the other end to which one end of the reducing pipe (43b) as a small-diameter pipe is connected. The other end of the reducing pipe (43b) includes a flared portion (43c) and provided with a nut (43d) as a fastening member. The flared portion (43c) of the reducing pipe is configured to be flare-connected to another refrigerant pipe (41).

Figure 7:
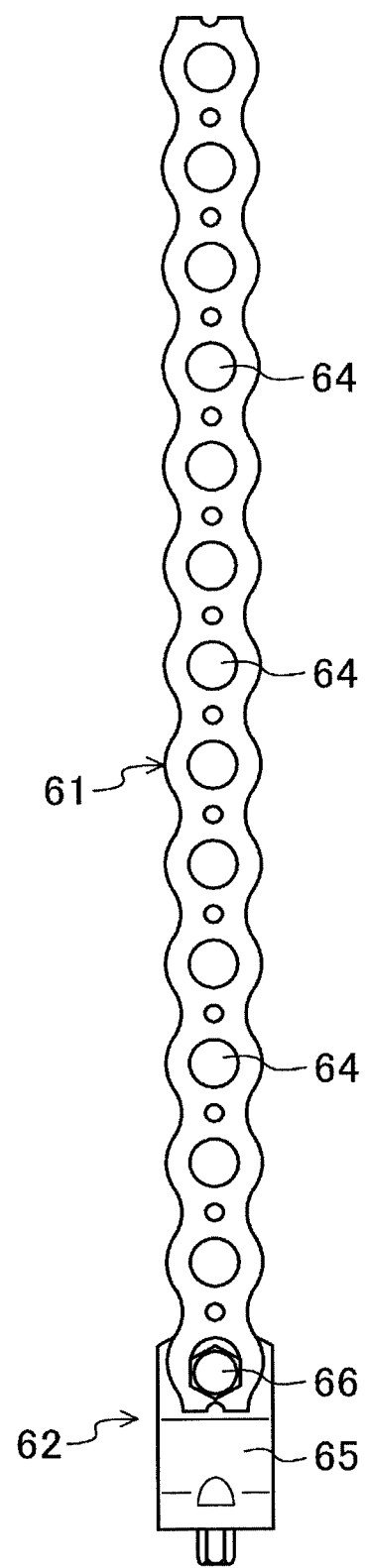
FIG. 7 is a plan view showing a band body of a suspending band.
Figure 8:
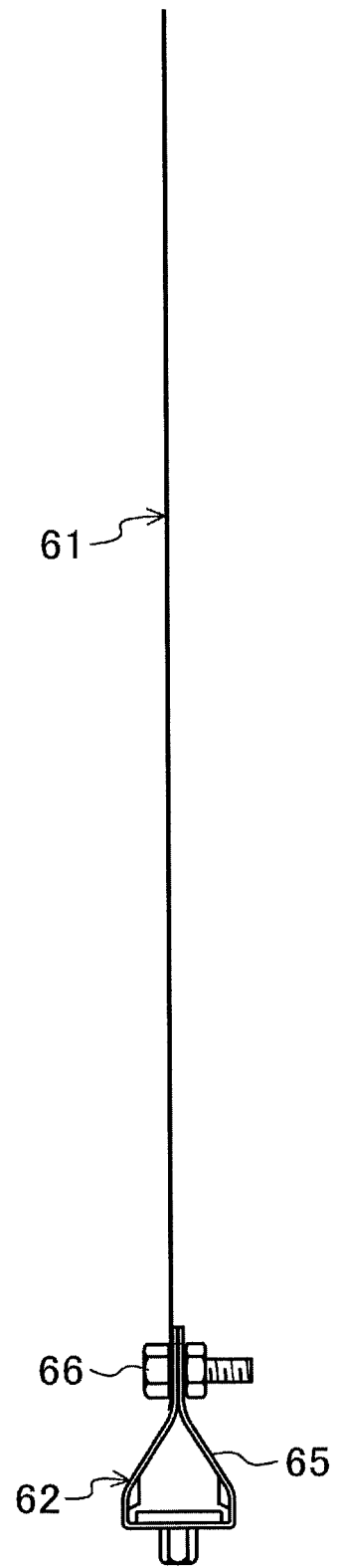
FIG. 8 is a side view showing the band body of the suspending band.
Figure 9:
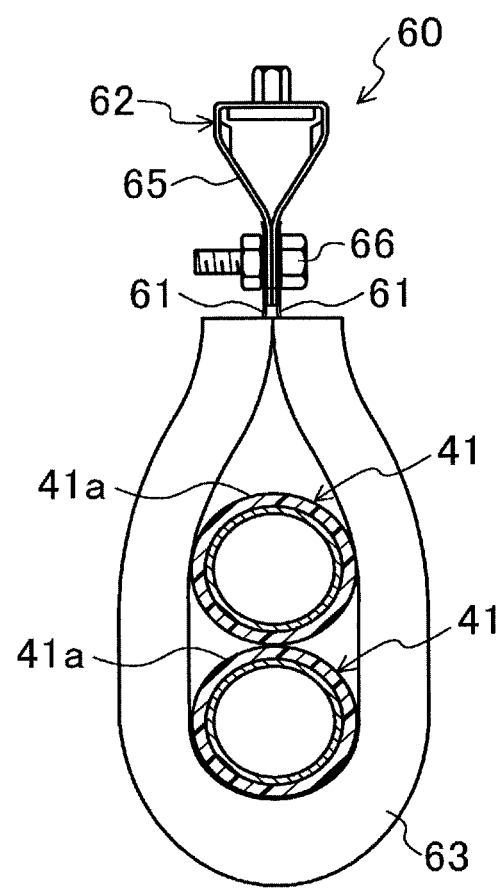
FIG. 9 is a side view showing the suspending band in use.

As shown in FIGS. 7-9, the refrigerant pipe (41) is attached to an attachment position such as the ceiling of the building with a suspending band (60). The suspending band (60) includes a band body (61) which is a general-purpose band, a band coupling (62), and an elastic member (63).

The band body (61) is in the shape of a thin strip, and is provided with a plurality of attachment holes (64) which are arranged at regular intervals in the longitudinal direction of the band body. The band body (61) is configured to be bendable to hold the pipe unit (50), for example, and is suitably cut and set to have a predetermined length according to the diameter of the refrigerant pipe (41).

The band coupling (62) includes an interconnecting member (65) mounted on a suspending metal fitting attached to the attachment position such as the ceiling, and a fastening member (66) including a bolt and a nut for fastening both ends of the band body (61) to the interconnecting member (65). Specifically, the fastening member (66) is configured to fasten both of the ends of the band body (61) that is wound around the refrigerant pipe (41).

The elastic member (63) has the shape of a cylinder, in which the band body (61) is inserted. With the band body (61) holding the refrigerant pipe (41), the elastic member

(63) is located between the heat insulator and the band body (61) to protect the heat insulator (41a) of the refrigerant pipe (41).

Method for Installing the Air Conditioner (10)

An installation procedure, which is a method for installing the air conditioner (10), will be described below. The installation method includes a method for conducting a gastight test.

Figure 10:
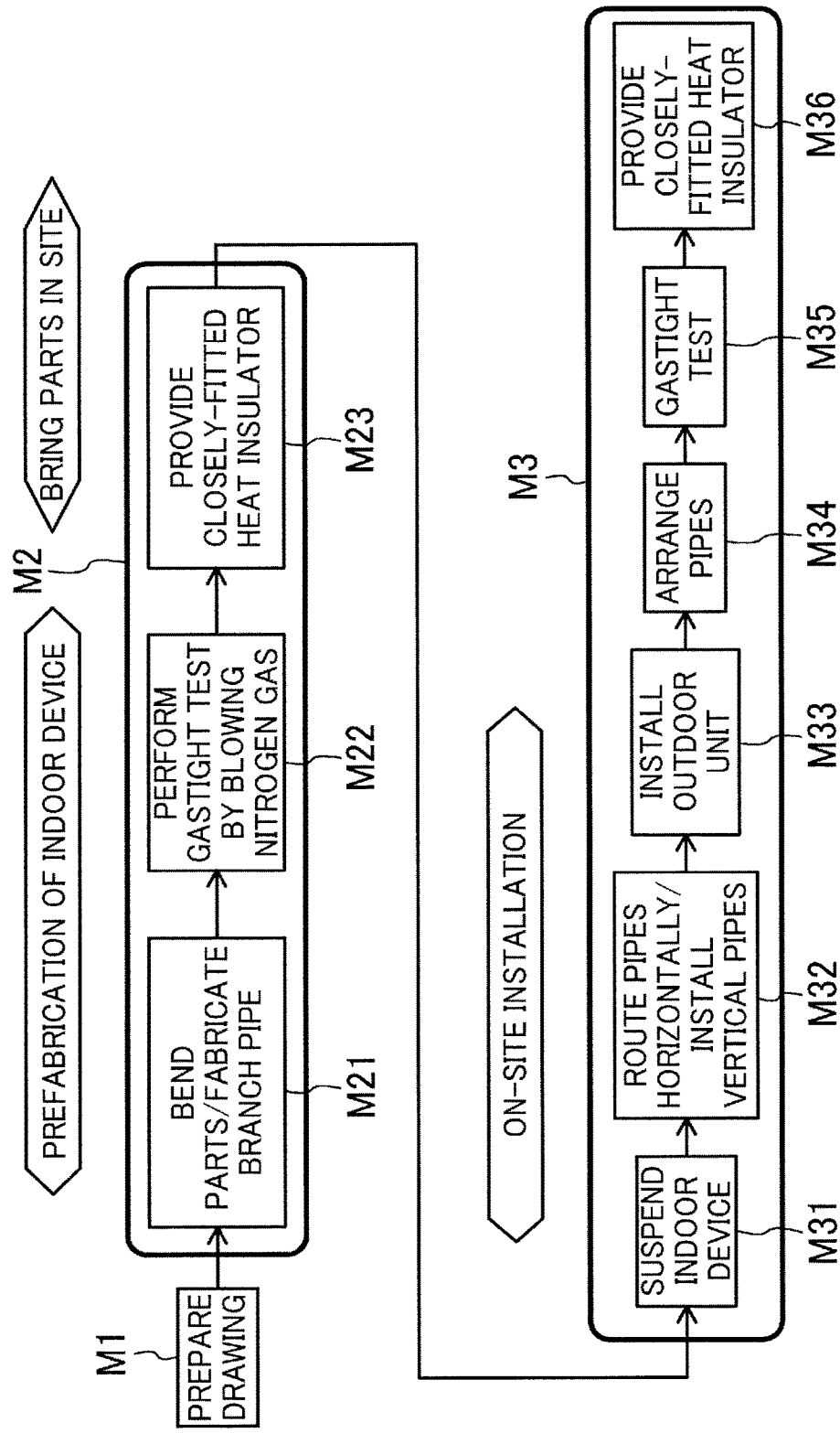
FIG. 10 is a flow chart showing a procedure of installation of an air conditioner.

First, the installation of the air conditioner (10) begins by receiving an architectural drawing after accepting an order of installation work as shown in FIG. 10. For example, the installation begins by receiving a design drawing of the building (11).

The installation of the air conditioner (10) includes a planning step (M1), a part fabrication step (M2), and an installation step (M3). The planning step (M1) includes a design drawing receiving step (M11), a piping drawing preparation step (M13), and a determination step (M14) as shown in FIG. 11.

In the planning step (M1), a piping drawing is prepared based on the design drawing of the building (11) in which the air conditioner (10) will be installed, and factory-assembled parts and site-assembled parts of the refrigerant circuit (40) are determined.

Figure 11:
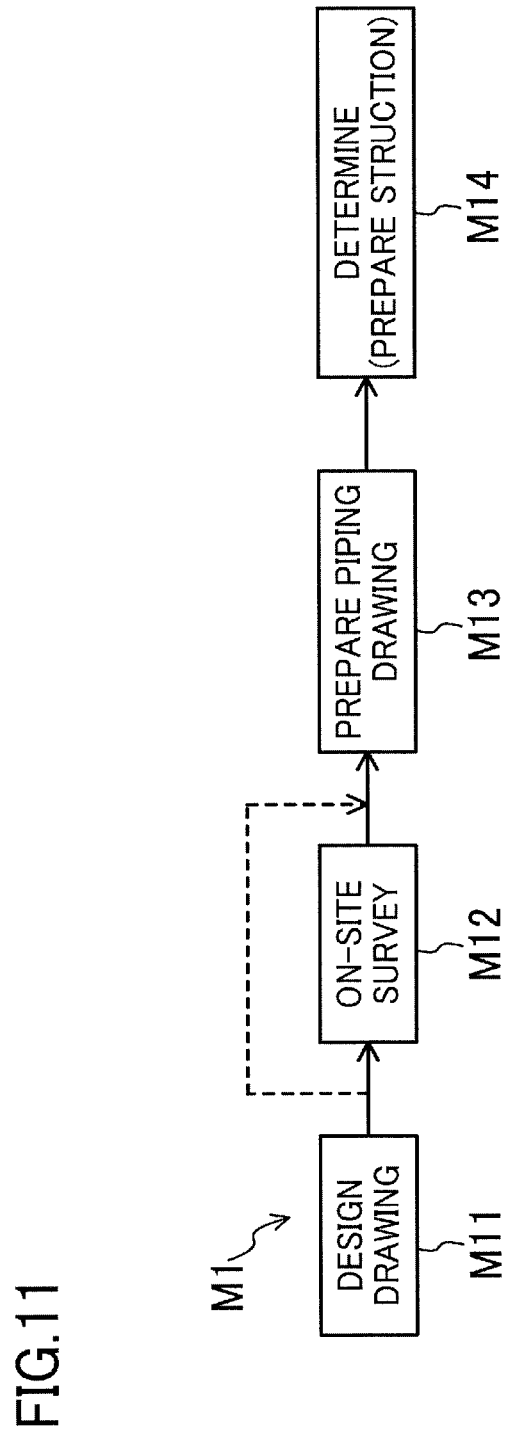
FIG. 11 is a flow chart showing a planning step of the air conditioner.

As shown in FIG. 11, in performing the planning step (M1), the flow starts with the design drawing receiving step (M11) in which the design drawing is received, and then may proceed to the piping drawing preparation step (M13) after an on-site survey step (M12). Alternatively, the piping drawing preparation step (M13) may be performed while obtaining information about the site concurrently.

Specifically, in the case of renewal work, the building (11) already exists. Thus, survey of the building (11) is carried out to check the actual structure of the building (11) such as a beam structure. When the site survey step (M12) is finished, the flow will proceed to the piping drawing preparation step (M13) to prepare the piping drawing based on the actual structure of the building (11).

In constructing a new building, on the other hand, the survey of the building (11) is impossible. Thus, when the design drawing is received, the piping drawing preparation step (M13) is performed while obtaining information about the site as the construction progresses to prepare the piping diagram with the progress of the construction of the building (11).

Figure 12:
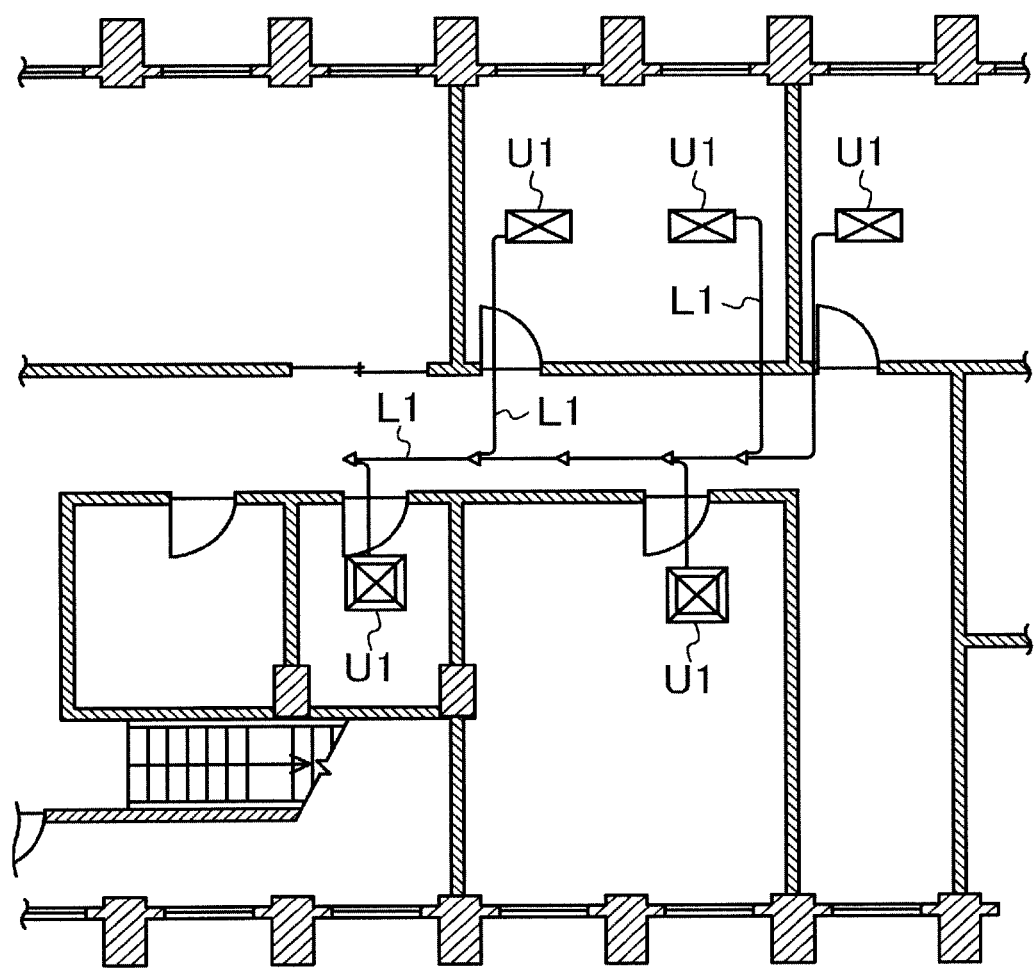
FIG. 12 is a plan view showing a design drawing of a building.

Specifically, the design drawing may be a plan view of each floor of the building (11) which shows lines indicating the piping of the air conditioner as shown in FIG. 12, for example. The design drawing shows unit marks (U1) indicating the indoor units (30) and line marks (L1) indicating the refrigerant pipes.

Figure 13:
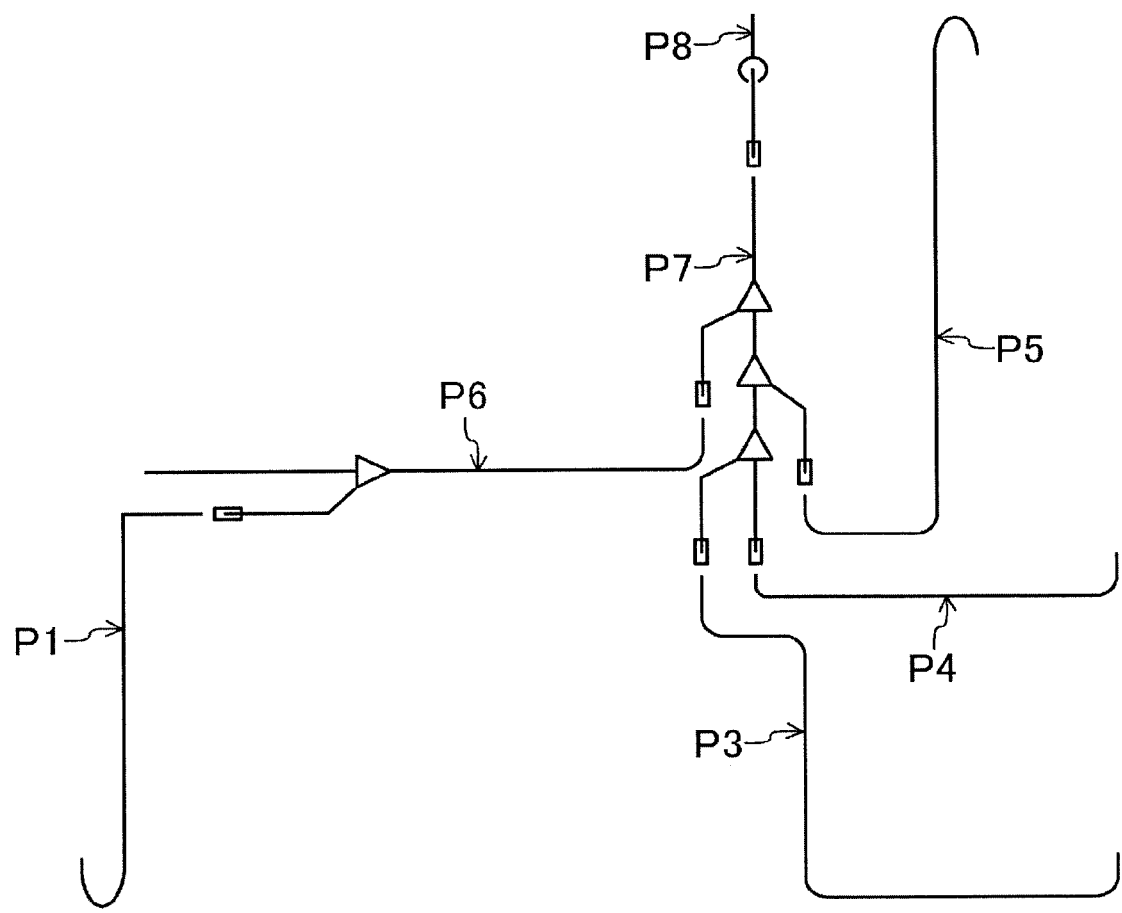
FIG. 13 is a plan view showing a piping drawing of the building.

On the other hand, as shown in FIG. 13, the piping drawing is a detailed drawing showing a piping system in which combined are part marks (P1-P8) corresponding to the parts (42) determined as the factory-assembled parts based on the design drawing and the results of the on-site survey and other data. Specifically, the first to fifth part marks (P1-P5) indicate the parts (42) obtained by bending or curving the straight pipes, with their dimensions such as lengths (not shown). The sixth and seventh part marks (P6, P7) indicate the parts (42) obtained by connecting the extension pipes (56) to the branch coupling (55), with their dimensions such as lengths (not shown). The sixth part mark (P6) indicates, for example, the pipe unit (50) shown in FIGS. 2-4. The eighth part marking (P8) indicates the part (42) serving as a riser pipe, with its dimension such as a length (not shown).

Subsequent to the piping drawing preparation step (M13), the flow proceeds to the determination step (M14) to distinguish the plurality of parts (42) by color-coding, for example. Specifically, the refrigerant pipe (41) of the refrigerant circuit (40) is comprised of the parts (42) such as the straight pipes and the pipe units (50). Thus, those parts (42) are given distinguishing identifications in accordance with their positions to which they are attached.

For example, as shown in FIGS. 4 and 5, the pipe unit (50) is provided with the distinguishing identifications such as the tapes (57) which are colored in, e.g., red, and wound around both ends of the pipe unit. Thus, an instruction indicating installation positions of the color-coded parts (42) is prepared in the determination step (M14). Specifically, the installation positions of the parts (42) are provided in a written form such that workers in charge of the installation can understand the installation positions of the parts (42). For example, the instruction specifies the colors and numbers given to both ends of the pipe unit (50) as shown in FIGS. 4 and 5.

Subsequent to the planning step (M1), the flow proceeds to the part fabrication step (M2) to fabricate, in the factory, the plurality of parts (42) of the refrigerant circuit (40) corresponding to the factory-assembled parts.

Specifically, the part fabrication step (M2) includes a fabrication step (M21), a gastight test step (M22), and a heat retention step (M23). In the fabrication step (M21), the parts (42) are fabricated, and the distinguishing identifications indicating their installation positions are given to the parts by color cording and numbering, for example, based on the piping drawing. Specifically, the pipe unit (50), which is one of the parts (42), is fabricated. For example, in the pipe unit (50) as the branch pipe unit, the short pipe (55b) and the coupling (56) are connected together by brazing to fabricate the liquid pipe (51) and the gas pipe (52). That is, the pipe unit (50) is fabricated in the factory, and the brazing process using fire is performed there.

Subsequent to the fabrication step (M21), the gastight test step (M22) is performed. For example, when the pipe body (53) is fabricated, a gastight test is performed by blowing a nitrogen gas before covering the pipe body (53) with the heat insulator (54).

If the gastight test step reveals that the parts (42) are gastight, the flow proceeds to the heat retention step (M23) to provide each of the parts (42) with the heat insulator (54). For example, in the fabrication of the pipe unit (50), the liquid pipe (51) and the gas pipe (52) are each covered with the heat insulator (54), and then the liquid and gas pipes (51, 52) covered with the heat insulator (54) are fixed together to finish the fabrication of the pipe unit (50). A fitting coupling (43) is attached to one end of the pipe unit (50)

The liquid pipe (51) and the gas pipe (52) of the pipe unit (50) are fixed together with the colored tape (57) indicating the installation position, and the pipe unit (50) is numbered.

The lengths of those parts (42) that are the factory-assembled parts are set to be shorter than 4 m. Specifically, even the straight pipe parts (42) have their length set to be shorter than 4 m. In most cases, a general elevator has an opening (a width) of 2150 mm, a depth of 1600 mm, a height of 2300 mm, and a diagonal length of 3467 mm. Thus, the lengths of each of those parts (42) is set to be shorter than 4 m such that the workers can take the elevator to carry the parts. Conversely, if the length of any of those parts (42) were 4 m or more, the workers would have to go up the stairs to carry that part (42).

Subsequent to the part fabrication step (M2), the flow proceeds to the installation step (M3) to install the plurality of parts (42) fabricated in the part fabrication step (M2) and the plurality of devices of the refrigerant circuit (40) corresponding to the site-assembled parts determined in the planning step (M1) (namely, the pipe unit (50), the outdoor unit (20), and the indoor unit (30)) in the building (11).

Specifically, the installation step begins with an indoor device installation step (M31). The indoor units (30) as the indoor devices are suspended such that the indoor units (30) are installed on the ceiling of those rooms. Then, the flow proceeds from the indoor device installation step (M31) to a piping step (M32) to attach vertical pipes as the straight pipes, for example.

In this piping step (M32), the pipe unit (50) and the straight pipes fabricated in the factory are connected together. In this step, the pipe unit (50) and every one of the straight pipes are connected together via the fitting couplings (43), i.e., a brazing process or any other work using fire is not performed. The refrigerant pipe (41) is mounted onto the ceiling with the suspending band (60).

When the piping step (M32) is finished, the flow proceeds to an outdoor device installation step (M33) to install the outdoor unit (20) as the outdoor device. Then, the flow proceeds from the outdoor device installation step (M33) to a piping step (M34) to arrange pipes around the outdoor device. Also in this step, the fitting couplings (43) are used to connect every pair of pipes, i.e., a brazing process or any other work using fire is not performed.

When the piping step (M34) is finished, the flow proceeds to the gastight test step (M35) to perform a gastight test on the refrigerant circuit (40) by blowing a nitrogen gas. Specifically, the gastight test is performed to check whether there is any gas leakage from the couplings (43) or not. This gastight test is performed on the refrigerant systems (1A, 1B, 1C) by dividing each of these systems into a plurality of sections.

If the result of the gastight test reveals that the refrigerant circuit (40) is gastight, the flow proceeds to the heat retention step (M36) to apply the heat insulators (not shown) to the straight pipes and other members. Thus, the installation of the pipes is completed.

Advantages of Embodiment

As can be seen from the forgoing description, according to the present embodiment, the factory-assembled parts and the site-assembled parts of the refrigerant circuit (40) are determined in the planning step (M1), and the parts (42) of the refrigerant circuit (40) are fabricated in the factory. This reduces the number of days required for the installation significantly. Specifically, the connecting work which has been carried out on site is replaced with the work in the factory. This allows workers to get their work in a confined roof space and other time-consuming jobs done much more easily, thereby reducing the number of days required for the installation significantly.

Further, most parts of the refrigerant circuit (40) can be fabricated in the factory. Thus, on-site work using fire can be reduced, which will cut down the number of fire accidents to happen on site. In addition, the heat insulation work can also be performed in the factory. This increases the accuracy of the heat insulation work significantly, and prevents moisture condensation.

The piping drawing of the refrigerant circuit (40) is prepared based on the design drawing. This increases the accuracy of the factory-assembled parts, and makes it possible to perform most of the piping work in the factory. This ensures that the number of days required for the installation is significantly reduced even more reliably.

In particular, the piping drawing is prepared based on the on-site survey. This increases the accuracy of the factory-assembled parts, and ensures that the number of days required for the installation is significantly reduced even more reliably.

The piping drawing gives the parts (42) the distinguishing identifications. This clarifies the installation positions of the parts (42), simplifies the on-site installation, and ensures that the number of days required for the installation is significantly reduced even more reliably.

Further, the instruction indicating the installation positions of the parts (42) given the distinguishing identifications is prepared. This allows for preventing incorrect connection of the parts and other errors, thereby increasing the accuracy of the on-site installation.

The brazing process for connecting the parts (42) is performed only in the factory, and the on-site pipe connection process is performed using only the fitting couplings (43). Thus, work using fire is restricted to the factory, and no work using fire is performed on site any longer. This eliminates the occurrence of fire accidents on site. In addition, the brazing process performed in the factory reduces the number of positions where the fitting couplings (43) are used. This reduces the number of the expensive couplings (43) to use, which allows for cutting down the installation cost.

The pipe unit (50) fabricated in the factory is covered with the heat insulator (54) in the factory. This reduces significantly the need for covering the parts with the heat insulators (54) on site. As a result, the accuracy of the heat insulation work increases significantly, thereby preventing the moisture condensation with reliability. In particular, the moisture condensation may occur after a year or more has passed since the installation was finished. The pipe unit (50) is very effective at preventing such moisture condensation.

The pipe unit (50) fabricated in the factory has already turned out to be gastight by being subjected to a gastight test in the factory. This simplifies the gastight test to be performed on site. Specifically, even if any leakage is found by the on-site gastight test, the leakage point can be spotted easily, because there is no leakage point in the pipe unit (50).

Further, use of the general-purpose band as the band body (61) of the suspending band (60) makes the on-site installation very simple.

Further, with the plurality of (64) attachment holes cut through the band body (61), the refrigerant pipes (41) with multiple different diameters are held by the single band body (61).

The band coupling (62) mounted to the building (11) allows for both of the fastening of the band body (61) and the mounting of the band body (61) to the building (11) using a single member.

<Other Embodiments>

The above-described embodiment of the present invention may be modified in the following manner.

The three refrigerant systems (1A, 1B, 1C) of the air conditioner (10) may be replaced with only a single refrigerant system.

Naturally, the pipe unit (50) may be implemented as any of various types of pipe elements such as headers.

The embodiments described above are merely illustrative ones in nature, and do not intend to limit the scope of the present invention or applications or uses thereof.

INDUSTRIAL APPLICABILITY

As can be seen from the forgoing description, the present invention is useful as air conditioners to be installed in buildings and other constructions.

Description of Reference Characters

10 Air conditioner
11 Building (construction)
20 Outdoor unit
30 Indoor unit
40 Refrigerant circuit
41 Refrigerant pipe
42 Part
50 Pipe unit
51 Liquid pipe
52 Gas pipe
53 Pipe body
54 Heat insulator

The invention claimed is:

1. A method for fabricating a pipe unit for an air conditioner, the pipe unit being provided for a refrigerant circuit which performs a vapor compression refrigeration cycle by circulating a refrigerant, the method comprising:

a step of fabricating a liquid pipe through which a liquid refrigerant for the refrigerant circuit flows and a gas pipe, separate from the liquid pipe, through which a gaseous refrigerant for the refrigerant circuit flows;

a step of covering each of the liquid pipe and the gas pipe with a heat insulator; and a step of fixing together the liquid pipe and the gas pipe with tape indicating a connection position for the fixed together pipes, each of which is covered with the heat insulator, to finish the fabrication of the pipe unit.

2. A method for installing an air conditioning device including an indoor unit, an outdoor unit connected to the indoor unit through a refrigerant pipe and a refrigerant circuit in which a refrigerant is circulated between the indoor and outdoor units and, the method comprising:

a part fabrication step of fabricating a pipe unit provided for the refrigerant circuit; and an installation step of installing and connecting together the outdoor, indoor and pipe units in a building, wherein the part fabrication step includes a step of fabricating a liquid pipe through which a liquid refrigerant for the refrigerant circuit flows and a gas pipe, separate from the liquid pipe, through which a gaseous refrigerant for the refrigerant circuit flows, a step of covering each of the liquid and gas pipes with a heat insulator, and a step of fixing together the liquid and gas pipes with tape indicating a connection position for the fixed together pipes, each of which is covered with the heat insulator, to finish the fabrication of the pipe unit.

3. The method of claim 2, wherein in the installation step, only a fitting coupling requiring no work using fire is used to connect the pipe unit to another pipe.

* * * * *